(12) United States Patent
Kagan

(10) Patent No.: US 10,530,738 B2
(45) Date of Patent: Jan. 7, 2020

(54) DNS RESOLUTION REPLAY FOR BARE DOMAIN NAMES THAT MAP TO "A" RECORDS

(71) Applicant: Cedexis, Inc., Portland, OR (US)

(72) Inventor: Martin Kagan, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 516 days.

(21) Appl. No.: 14/454,691

(22) Filed: Aug. 7, 2014

(65) Prior Publication Data

US 2016/0043990 A1    Feb. 11, 2016

(51) Int. Cl.
*G06F 15/173* (2006.01)
*H04L 29/12* (2006.01)

(52) U.S. Cl.
CPC .............................. *H04L 61/1511* (2013.01)

(58) Field of Classification Search
None
See application file for complete search history.

(56) References Cited

U.S. PATENT DOCUMENTS

| 8,924,581 | B1* | 12/2014 | Acharya | H04L 65/608 370/395.5 |
| 9,137,300 | B1* | 9/2015 | Marshall | H04L 67/1002 |
| 9,137,301 | B1* | 9/2015 | Dunlap | H04L 67/101 |
| 9,354,855 | B2* | 5/2016 | Kruglick | G06F 8/36 |
| 9,385,988 | B2 | 7/2016 | Kagan | |
| 9,553,844 | B2 | 1/2017 | Kagan | |
| 2003/0163722 | A1* | 8/2003 | Anderson, IV | H04L 29/12216 726/3 |
| 2005/0239447 | A1* | 10/2005 | Holzman | H04L 63/08 455/414.3 |
| 2006/0013158 | A1* | 1/2006 | Ahuja | H04L 12/4641 370/328 |
| 2008/0285575 | A1* | 11/2008 | Biswas | H04L 29/1232 370/401 |
| 2010/0198813 | A1* | 8/2010 | Chi | G06F 17/30864 707/722 |
| 2014/0143438 | A1 | 5/2014 | Kagan | |
| 2014/0164584 | A1* | 6/2014 | Joe | H04L 61/1511 709/223 |
| 2014/0344453 | A1* | 11/2014 | Varney | H04L 41/0803 709/224 |
| 2014/0379902 | A1 | 12/2014 | Wan et al. | |

(Continued)

OTHER PUBLICATIONS

"Choosing a Routing Policy—Amazon Route 53", online Aug. 3, 2014, <http://docs.aws.amazon.com/Route53/latest/DeveloperGuide/routing-policy.html#routing-policy-geo>.*

(Continued)

*Primary Examiner* — Brian Whipple
*Assistant Examiner* — Gregory P Tolchinsky
(74) *Attorney, Agent, or Firm* — Klarquist Sparkman, LLP

(57) ABSTRACT

The technology disclosed relates to DNS resolution of bare domain names of the form "myexample.com". A bare domain name is also called zone apex or naked domain. In particular, bare domains are resolved by look-up of "A" records, per the IETF standards for DNS resolution. Technology is disclosed that improves resolution of bare domains to edge servers or other devices of a content delivery network or cloud-based content provider (collectively referred to as CDNs).

27 Claims, 3 Drawing Sheets

(56) References Cited

U.S. PATENT DOCUMENTS

| | | | | |
|---|---|---|---|---|
| 2015/0205500 A1* | 7/2015 | Zacharias | ............... | H04L 67/42 715/763 |
| 2015/0215267 A1 | 7/2015 | Kagan | | |
| 2015/0288647 A1* | 10/2015 | Chhabra | ............. | H04L 61/1511 709/245 |

OTHER PUBLICATIONS

Sury, Ondrej. 'CNAME at the zone apex—draft-sury-dnsext-cname-at-apex-00'. IETF (Internet Engineering Task Force) [online]. Aug. 18, 2010. [retrieved on Jul. 30, 2014]. Retrieved from the Internet: <URL: http://tools.ietf.org/id/draft-sury-dnsext-cname-at-apex-00.html>. pp. 1-4.

'Akamai Pragma Debug Headers'. Mesmor. [online]. Mar. 18, 2012. [retrieved on Jul. 30, 2014]. Retrieved from the Internet: <URL: http://mesmor.com/2012/03/18/akamai-pragma-debug-headers/>. pp. 1-6.

'List of managed DNS providers'. Wikipedia. [online]. Jul. 16, 2014. [retrieved on Jul. 30, 2014]. Retrieved from the Internet: <URL: http://en.wikipedia.org/wiki/ List_of_ managed_DNS_providers>. pp. 1.

Damas Joao. et al. 'RFC 6891—Extension Mechanisms for DNS (EDNS(0))'. IETF (Internet Engineering Task Force). [online]. Apr. 2013. [retrieved on Jul. 30, 2014]. Retrieved from the Internet: <URL: http://tools.ietf.org/html/rfc6891>. pp. 1-12.

'Naked domain redirection?'. AWS (Amazon Web Services) Forum. [online]. Dec. 6, 2010. [retrieved on Jul. 30, 2014]. Retrieved from the Internet: <URL: https://forums.aws.amazon.com/thread.jspa?threadID=55995>. pp. 1-7.

'Amazon Route 53 Developer Guide API Version Apr. 1, 2013'. [online]. Jul. 2, 2014. [retrieved on Jul. 29, 2014]. Retrieved from the Internet: <URL: http://docs.aws.amazon.com/Route53/latest/DeveloperGuide/CreatingAliasRRSets.html>. 149 Pages. (pp. 54).

* cited by examiner

DNS RESOLUTION REPLAY FOR BARE DOMAIN NAMES THAT MAP TO "A" RECORDS

RELATED APPLICATIONS

This application is related to and incorporates by reference the following commonly owned applications: U.S. application Ser. No. 13/502,100 published as US 2012-0246290 A1 entitled "DNS Application Server", which is a section 371 national stage of PCT PCT/US10/51720, which claims the benefit of U.S. Prov. App. No. 61/251,136 (hereinafter '290 publication); U.S. application Ser. No. 13/502,106 published as US2012/0246315A1 entitled "Internet Infrastructure Survey" (hereinafter '315 publication), which is a section 371 national stage of PCT PCT/US10/55145, which claims the benefit of U.S. Prov. App. No. 61/258,042; and U.S. application Ser. No. 13/882,153 entitled "Surrogate Name Delivery Network", which is a section 371 national stage of PCT PCT/US11/57743, which claims the benefit of U.S. Prov. App. No. 61/258,042.

BACKGROUND

The technology disclosed relates to domain name system (DNS) resolution of bare domain names of the form "myexample.com". A bare domain name is also called zone apex or naked domain. In particular, bare domains are resolved by look-up of "A" records, per the Internet Engineering Task Force (IETF) standards for DNS resolution. Technology is disclosed that improves resolution of bare domains when used in conjunction with a content delivery network or cloud-based content provider (collectively referred to as CDNs).

DNS resolution is performed according to standards established by IETF. These standards were first established before the development of content delivery networks and content provider edge server technology.

DNS standards treat a bare domain name differently than a qualified name or a subdomain. For example, "google.com" is a bare domain name that links to an "A" record, while "www.google.com" is a subdomain that can link to either an "A" record or a canonical name (CNAME) record. An "A" record resolves directly to an IP address, while a CNAME record adds an abstraction layer that can resolve to another name for recursive resolution. Any subdomain that has a CNAME record is prohibited from having an "A" record or most any other record type. See "CNAME at the zone apex draft-sury-=dnsext-cname-at-apex-00" (Sury) (Aug. 18, 2010) Retrieved from the Internet: <URL: http://tools.ietf.org/id/draft-sury-dnsext-cname-at-apex-00.html> This creates a conflict that prevents an "A" record for a bare domain from coexisting with a CNAME or other abstraction layer record.

"A" records are not directly compatible with routing to CDN edge servers. For example, an "A" record for myexample.com cannot be mapped to the subdomain myexample.akami.com of a CDN. Mapping to a subdomain within a CDN domain would allow myexample.com to be resolved to the closest and most responsive of, for example, Akamai's 1900 data center networks worldwide. However, because myexample.com is a bare domain, it is resolved using an "A" record that specifies an IP address, without being translated to a subdomain within the CDN provider's domain zone. This is because the DNS standards do not provide a mechanism for mapping the bare domain to anything other than an IP address.

Managed DNS service providers have developed proprietary approaches to aliasing of bare domains. For instance, one managed DNS service provider provides a proprietary alias record scheme. Compare Hirose, "Naked Domain Redirection?" on AWS Forum (posted Dec. 6, 2010) Retrieved from the Internet: <URL: https://forums.aws.amazon.com/thread.jspa?threadID=55995>; with Amazon Route 53, "Creating Alias Resource Record Sets", p. 54 in Developer Guide (API Version Apr. 1, 2013) Retrieved from the Internet: <URL: http://docs.aws.amazon.com/Route53/latest/DeveloperGuide/CreatingAliasRRSets.html>. Using this approach, the bare domain myexample.com would be resolved by a provider's proprietary DNS server. The provider's DNS server receives a bare domain DNS request, looks up the proprietary alias record, and uses the proprietary mapping to return an IP address for a CDN (potentially cloud based resources, in Amazon's case.) That is, the proprietary alias record running on a proprietary DNS server causes non-standard behavior: the authoritative DNS server acts recursively, using a subdomain name in an alias record to recursively resolve what began as a bare domain DNS request. It ends up returning an IP address for a CDN.

It is desirable to provide new alternatives for resolving bare domains that connect a requestor using a bare domain name to a CDN or other cloud-based content source.

DETAILED DESCRIPTION

Figure 1:
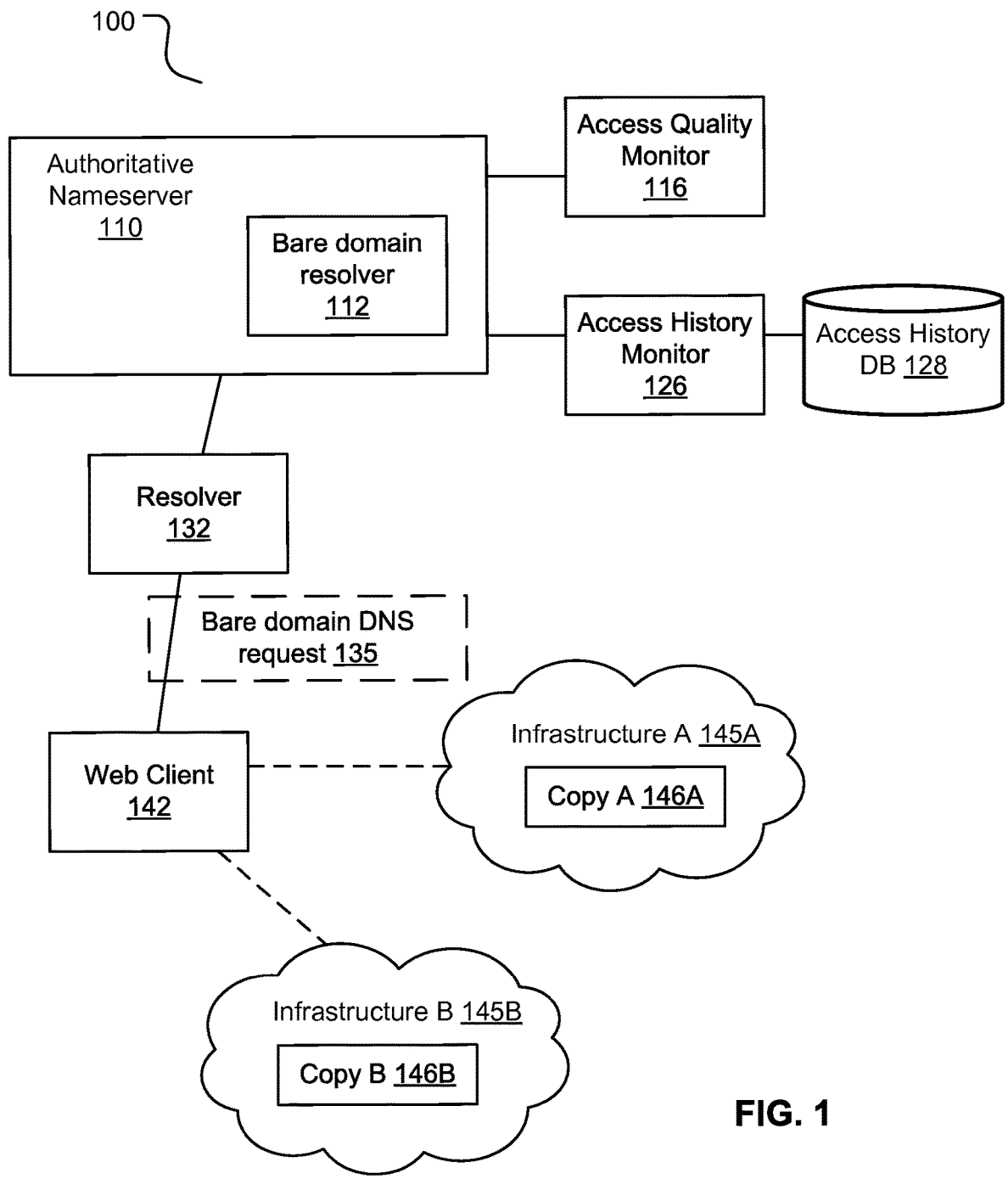
FIG. 1 is a high level block diagram of an example environment in which bare domain resolution replay technology can be applied.

The following detailed description is made with reference to the figures. Preferred embodiments are described to illustrate the technology disclosed, not to limit scope, which is defined by the claims. Those of ordinary skill in the art will recognize a variety of equivalent variations on the description that follows. A detailed description of implementations of the technology disclosed is provided with reference to the FIGS. 1-4.

The technology disclosed relates to bare domain DNS request resolution via "A" records to CDN servers. The technology disclosed handles routing a bare domain DNS request for a first domain from a resolver to a nameserver at an IP address specified by a record. The nameserver interacts with a resolution history monitor that maintains a recent resolutions database of the way at least one target CDN has recently resolved qualified DNS requests for subdomains of the first domain originating from various request locations of resolvers or web clients. The nameserver returns one or more IP addresses of the target CDN based at least in part on the request location and the recent resolutions database. The request location can be a logical location or an approximate physical location. The so-called Extension Mechanisms for DNS (EDNS) protocol can be used to identify the request location in conjunction with the technology disclosed. See "Extension Mechanisms for DNS (EDNS(0))" (Damas) (April 2013) Retrieved from the Internet: <URL: http://tools.ietf.org/html/rfc6891>.

Other aspects and advantages of the technology disclosed can be seen on review of the drawings, the detailed description and the claims, which follow.

Proprietary DNS servers can provide a DNS resolution that is as close to the CDN's edge server as to the location of the proprietary DNS server. If proprietary DNS servers were as widely distributed as edge servers or co-located with them, DNS resolution by the most favorably located proprietary DNS server would produce short hops from resolver to proprietary DNS server to CDN edge server. However, there are many fewer proprietary DNS server locations (points of presence, POPs) than edge servers, perhaps by a hundredfold. See, e.g., Wikipedia, "List of managed DNS providers" (with POP counts) Retrieved from the Internet <URL: http://en.wikipedia.org/wiki/List_of_managed_DNS_providers>. For managed DNS resolution, an array of 20 proprietary DNS servers would tend to concentrate traffic towards just one percent of the servers in a CDN network of 1900 edge servers, because the CDN's DNS resolver detects the location of the proprietary DNS server and responds accordingly.

The technology disclosed is CDN agnostic. Unlike a CDN's proprietary solution, it does not favor CDN customers who use a CDN network's captive managed DNS provider.

The inventors recognized that existing managed DNS server solutions have a weakness. Managed DNS servers initiate recursive DNS requests to CDN nameservers that treat the request as originating from the DNS server location, rather than at the requestor's location. A requestor in North Dakota seeking a web resource hosted on Akamai edge servers for a content provider that uses a managed DNS provider in Chicago will be directed to an edge server that has a low latency connection to Chicago instead of Fargo.

The CDN nameservers respond to managed DNS servers' requests by identifying edge servers, cloud based resources, or load balancers that can serve the managed DNS server with low latency. The low-latency redirection is selected without taking into account the difference between the location of the resolver 132 or the web client 142 from which the bare domain DNS request 135 originated and the location of the managed DNS server. Providers do not identify this as a problem, because even 20 proprietary DNS servers with proprietary alias records do a better job distributing bare domain requests than a standard DNS server that relies on "A" records. Vendors of managed services advertise themselves as solving a problem, rather than creating a new problem.

The inventors were in a unique position to recognize and address this problem, as the CEDEXIS™ platform, which is described in other commonly owned patent applications that are incorporated by reference, can provide data from which recently returned IP addresses from a CDN to particular requestor locations that can be replayed. Data capabilities are detailed in the "315 publication, cited above. In general, managed DNS service providers do not have similar capabilities and would not be expected to turn their development efforts towards resolution replay.

One extension of the previously described technology is to avoid replaying DNS resolution of bare domains, since they are resolved by "A" records or by the locations of managed DNS service locations. Instead, resolution replay is based on observations of resolutions of subdomains such as www.myexample.com, which can be redirected by a CNAME record to myexample.akami.com.

FIG. 1 is a high level block diagram of an example environment 100 in which bare domain resolution replay technology can be applied. In this environment, the web client 142 makes a bare domain DNS request 135 to resolve a bare domain name, such as myexample.com. Content from the domain zone myexample.com is then requested for www.myexample.com, by a fully qualified domain name (FQDN), instead of by its bare domain name. Resolution or translation of an FQDN to an IP address is described in publication RFC 1035 of the Internet Engineering Task Force (IETF) entitled, "Domain Names Implementation and Specification," as well as in additional IETF publications related to DNS including RFC 1033, 1034, 1912, 2136, 2181, 2535, 2671, and 4033.

Web clients generally seek a resource by specifying a Uniform Resource Locator (URL) including a name of the resource, a hostname, and a protocol indicator. The hostname specified is generally a hostname in the resource provider's domain. In one example, web client 142 seeks a resource such as a database named RPdata located with the domain name myexample.com. The HTTP protocol can be invoked with the prefix http://. The resource can be located at http://RPhost1.example.com/RPdata, or more simply at http://example.com/RPdata.

Continuing the example above, the user or someone involved in authoring or configuring a user's web client will sometimes choose as a shortcut to omit "www" and use only the bare domain name. This shortcut assumes that the bare domain name will return the same web site as the "www" subdomain, which is usually true. This shortcut ignores and thwarts content delivery mechanisms that reduce latency by selecting a server, such as an edge server, based on the availability of low latency links from the web client location 142 or the resolver location 132.

All or part of the domain zone myexample.com can be hosted on one or more infrastructures 145A-B. Two or more copies 146A-B of a resource sought by web client 142 can be maintained by one or more infrastructures 145A-B, such as CDNs. The resolution replay technology disclosed works both for resolution within one CDN and for resolution among multiple CDNs that compete with one another for business. The resolution of bare domain DNS request 135 determines which copy 146A-B of the resource the web client 142 will access.

A resolver 132 seeks DNS resolution for web client 142. Resolver 132 operates according to protocols described by IETF documents including RFC 1033. The URL request by the web client triggers-a DNS query such as the bare domain request 135. For a bare name request, resolver 132 identifies nameserver 110 as authoritative for the specified domain, myexample.com. The resolver 132 forwards at least part of request 135 for resolution of myexample.com to the authoritative nameserver 110.

The bare name myexample.com maps to an "A" record, according to IETF specifications. The technology disclosed uses a bare domain revolver 112 to improve on use of an "A" record to resolve the bare domain. For the domain zone that nameserver 110 represents as authoritative, the bare domain resolver 112 interacts with an access history monitor (AHM) 126. The AHM 126 uses an access history database, table or other data store 128. Instead of relying on an IP address listed in an "A" record for the bare domain, the bare domain resolver 112 obtains from the AHM 126 one or more IP addresses based on IP addresses recently returned by a CDN that hosts content for the domain zone of myexample.com.

The IP addresses selected for replay relate to a request location of the resolver 132 or the client 142. A request location originating from California is likely to be resolved to and serviced by a different edge server, and thus different IP addresses than a request originating in New York or Florida, because a CDN has servers positioned throughout the United States in order to reduce latency of responses.

The AHM 126 uses technology such as described in '315 publication to update the access history database 128. Survey code running on clients and test resources hosted on CDNs generate live up-to-the-minute samples of DNS resolution and resource responsiveness. The test resources can be specified by name rather than by IP address. When the test resource name is resolved, the AHM 126, typically in collaboration with an access quality monitor 116 (AQM), collects data reflecting the IP addresses to which the test resource was resolved. Request locations of clients running the survey code or of their resolvers are correlated with CDN resolutions for subdomains, such as the "www" subdomain of a bare domain. The AHM 126 continuously updates the access history database 128 with observed resolutions of a subdomain that maps to a CDN subdomain, such as www-.myexample.com mapped to myexample.akami.com. It compiles recently distributed IP address resolutions for replay.

The AHM 126 can be tuned to observe DNS resolutions for particular subdomains and not others when it compiles the access history database 128. In the example, "www" can be used as a subdomain from which to replay IP resolution history while "mail" is excluded. The authoritative nameserver 110 for myexample.com is configured with resource records for subdomains. The subdomains that map to CDNs, as opposed to mail servers or FTP servers, for instance, can be included in access history monitoring and used to compile resolution replay history. In other examples, subdomains and resources are configured by the CDN or the CDN's customer to resolve to a subdomain within a domain zone controlled by the CDN. The configuration data for mapping to the CDN's domain zone can be used by the AHM 126 to select IP resolution history to keep and use for replay.

The AHM 126 maintains updated information from survey code running on numerous web clients. The numerous clients detect changes in network availability and performance very quickly, such as in seconds or minutes. The same clients can track in real time the IP addresses handed out by CDNs for FQDNs. The AHM 126 uses this information to update its access history database 128, with current information superseding older information. The AHM 126 can spot changes in IP addresses handed out over time by a particular CDN. One way to do this is for the survey code to use server response headers to identify the IP address of the edge server to which the client is currently mapped. An example code implementation appears at "Akamai Pragma Debug Headers" retrieved from the Internet <URL: http://mesmor.com/2012/03/18/akamai-pragrna-debug-headers/>.

Monitoring of resource responsiveness is another part of the infrastructure survey described in prior disclosures. The AQM 116 in FIG. 1 uses technology described in previous patent applications that have been incorporated by reference. In this context, data from the AQM 116 can be used to select among multiple CDNs if the bare domain owner has multiple arrangements for handling traffic its resources. The AQM 116 can return a preferred CDN after running selector code, as described '290 publication.

Data from the AQM 116 also can be applied after candidate IP addresses from are obtained from the AHM 126. The technology previously disclosed for the AQM 116 can take into account more performance factors than a CDN considers when it resolves a request to one or more of its edge servers. The AQM 116 can be used to select among of the IP addresses available for CDN resolution replay, taking into account observed performance from a requestor location to the IP addresses available for replay.

Interaction of the bare domain resolver 112 with the AQM 116 and the AHM 126 can include caching. Caching of responses to FQDN requests for resolution is less of a problem for an authoritative nameserver 110 than for a general recursive resolver 132, because of the authoritative nameserver's limited role. The size of nameserver 110's cache relates to the granularity extent of location resolution, rather than the size of the whole Internet or the number of active routes in BGP tables. If the cache holds only resolver 132 locations or only ISP resolver locations, the cache size is modest. On the other hand, use of 32 bit IP address resolution for web clients 142 would result in either a large cache or frequent cache misses.

In environments of interest, the web client 142 can take one of a number of forms, including user interfaces, browser interfaces, application interfaces, mobile interfaces, tablet interfaces, or wearable interfaces. In some implementations, the web client can be a web-based or cloud-based application running on a computing device such as a personal computer, laptop computer, mobile device, and/or any other hand-held computing device. In one implementation, web client 142 can be a browser running on a computing device. The browser can be Chrome, Internet Explorer, Firefox, Safari, and the like. In other implementations, web client 142 can run as an engagement console on a computer desktop application.

The resolver 132 can run on a router or specialized DNS resolution hardware. Alternatively, it can be implemented using specialized software running on varying types of hardware including a workstation, server, computing cluster, blade server, or server farm, or other data processing system or computing device capable of executing the specialized software.

The AHM 126 and AQM 116 also can include specialized software running on hardware such as a workstation, server, computing cluster, blade server, or server farm, or other data processing system or computing device capable of executing the specialized software. The access history database 128 can be a relational database management system (RDBMS), object oriented database management system (OODBMS), distributed file system (DFS), no-schema database, or other data storing system.

Figure 3:
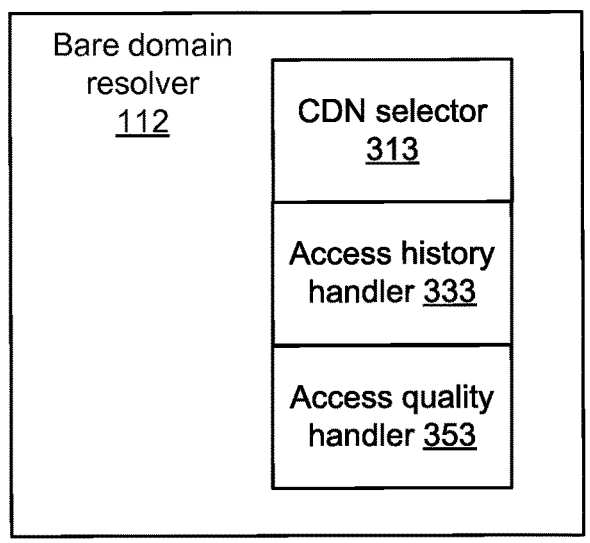
FIG. 3 is an example block diagram of a bare domain resolver.

FIG. 3 is an example block diagram of a bare domain resolver. This provides additional detail of component of the bare domain resolver 112. The components include a CDN selector 313, access history handler 333 and access quality handler 353. When a domain zone is supported by multiple CDNs (including so-called cloud resources) the CDN selector 313 selects one of the multiple CDNs for resolution replay. As described above, selector code detailed in a prior application can be used by an access quality monitor or an access history monitor or by the bare domain resolver with information cached from an access history monitor to select among multiple CDNs. A DNS request name can be constructed by combining the bare domain request with a domain zone of the selected CDN.

In some implementations, selection of multiple CDNs for further processing can be supported. Selection code can prioritize among CDNs. Quality measurement information from the AQM 116 can be used to evaluate IP addresses returned by multiple CDNs and determine a single CDN to use for resolution replay.

An access history handler 333 directs a request to an AHM 126 or uses data cached from an AHM 126. The access history handler 333 identifies one or more IP addresses returned by the selected CDN responsive to requests for qualified domains within the domain zone of the bare domain. There may be more IP addresses available for replay than are allowed in a DNS resolution response. If so, the access history handler 333 can use the access quality handler 353 to select among available IP addresses based on their performance in response to requests from the request location. DNS resolution is not unique. A FQDN may be resolved to as many as eight IP addresses. The order in which these addresses are used during replay can be varied. The access history handler 333 can replay a group of IP addresses in the same order as observed from the CDN, on a round robin basis so that each address on the list is sometimes listed first, on a weighted basis so that one or more earlier IP addresses in CDN returned orderings usually appear closer to the beginning of the list, or in a randomized order.

Figure 2:
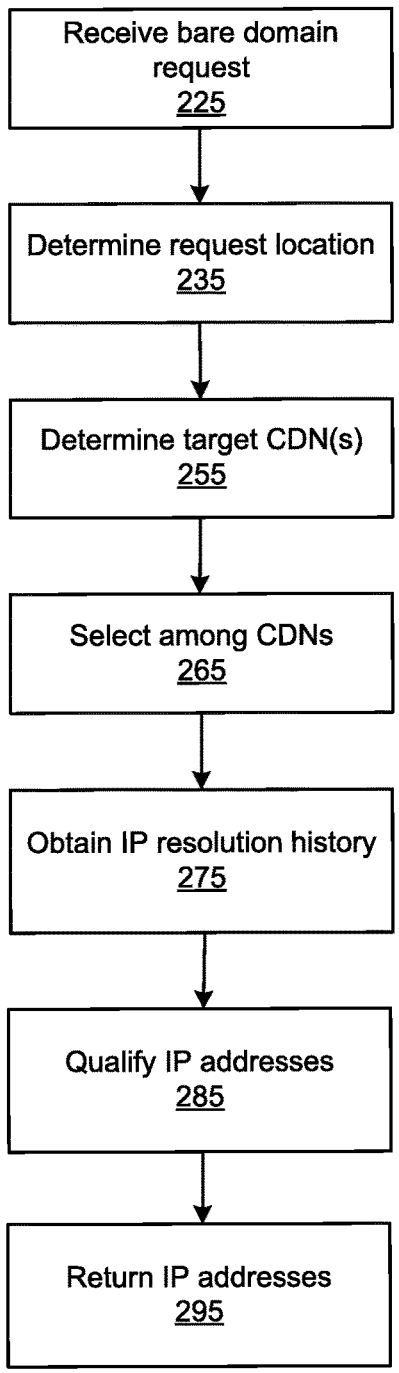
FIG. 2 is an example flowchart resolving a bare domain DNS request to one or more IP addresses of CDN devices hosting requested resources, such as edge servers or load balancers.

FIG. 2 is an example flowchart of a process that resolves a bare domain DNS request to one or more IP addresses of CDN devices hosting requested resources. An example CDN device is an edge server. This flowchart is depicted from the perspective of a nameserver. Flowcharts also could be presented from the perspective of a web client, resolver, AHM, or AQM. Some implementations of the technology disclosed may perform the steps in different orders and/or with different, fewer or additional steps than the ones illustrated in FIG. 2. The actions described below can be subdivided into more steps or combined into fewer steps to carry out the method described using a different number or arrangement of steps.

This process is described, for convenience, with reference to a system such as the system in FIG. 1, although the system itself is not part of the method.

At step 225, the flow begins with a nameserver 110 receiving a bare domain request 135. This request typically comes from a resolver. The bare domain request may be received by a nameserver in its role as an authoritative nameserver for the domain zone of the bare domain.

At step 235, the nameserver 110 or a bare domain resolver 112 determines a request location for the request. Determining the request location can be as simple as using an IP address of a resolver 132 making the request. It can involve masking a 32 bit IP address to a smaller number of bits. It can involve deep inspection into socket information for the bare domain request 135 to identify an IP address of a web client. In some implementations, the bare domain request could be accompanied by supplemental location-type information that the nameserver used to determine a request location 225 that can be used obtain relevant information from an AHM 126 or from a cache of information provided by the AHM 126.

At step 255, the CDN selector 313 of the bare domain resolver 112 determines at least one target domain. When only one CDN is under contract for the bare domain, CDN selection is unnecessary.

At step 265, when multiple CDNs are available for a bare domain, the CDN selector 313, for instance, interacts with an AQM 116 that has access to selector code and data from which a CDN can be selected for the specified bare domain. Step 265 can also or alternatively be part of step 285.

At step 275, replayable IP addresses for the selected CDN(s) are obtained. The access history handler 333, for instance, interacts with an AHM 126 to obtain IP addresses for resolution replay. Depending on the number of available replayable IP addresses, the addresses can be filtered either by the AHM 126 or upon receipt by the address history handler 333. As described in above, the list can be varied to spread an access load among available CDN resources.

At step 285, the replayable IP addresses obtained can be optionally qualified or adjusted by interaction with the AQM 116. As described above, this can be done by interaction with the AQM 116 or by caching of data and selector code from the AQM 116. Qualifying IP addresses 285 also or alternatively can include using data on performance of various replayable IP addresses to select among multiple CDNs. Thus for example, if two CDNs are available for a given request, at step 285 the one that is currently providing better response times could be selected.

Figure 4:
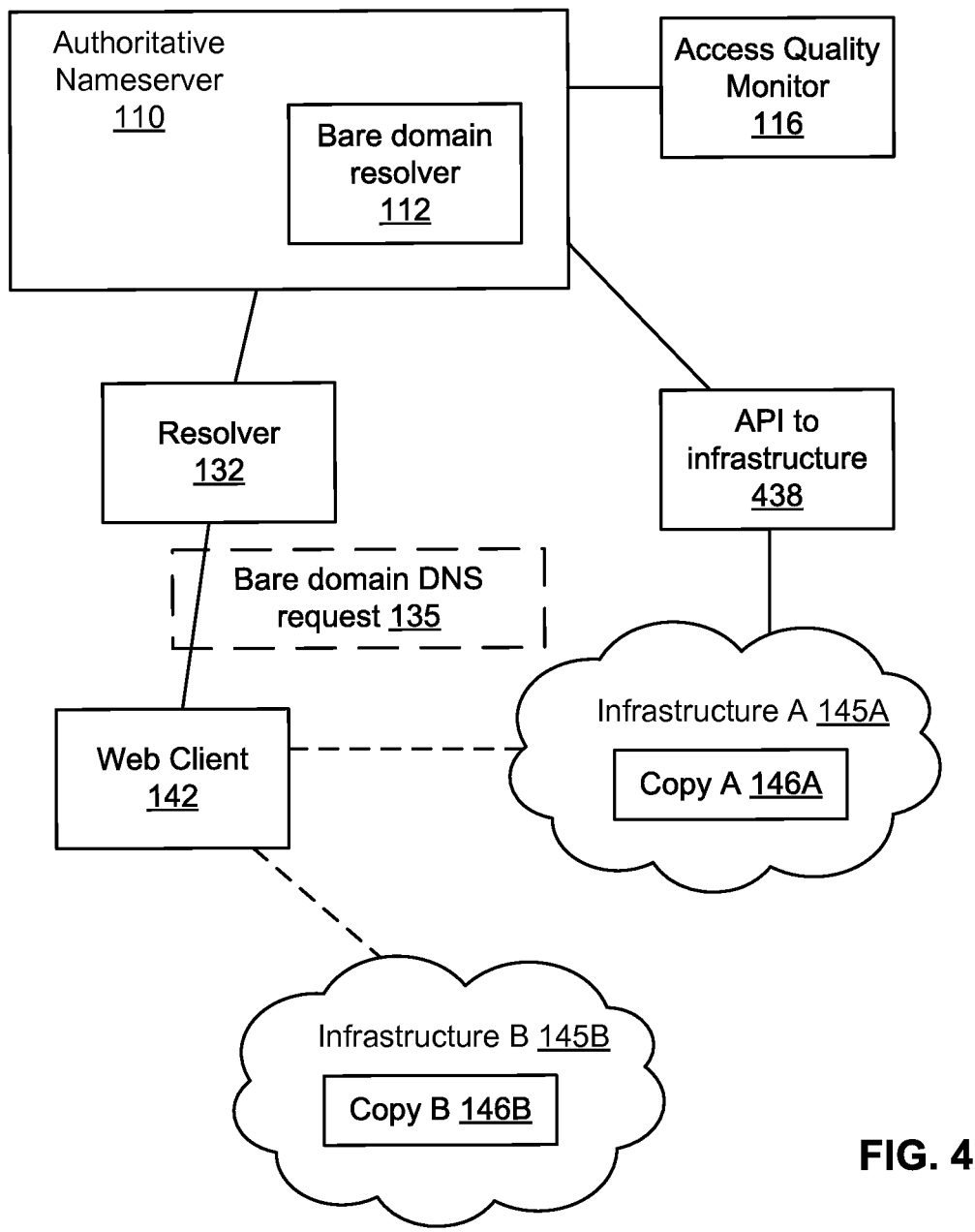
FIG. 4 is a high level block diagram of a second example of bare domain resolution.

FIG. 4 is a high level block diagram of a second example environment in which bare domain resolver technology can be applied. This second environment presents an alternative solution. The proprietary authoritative DNS server 110 or its bare domain resolver 112 accesses an API 438 to the infrastructure 145A. The API 438 is provided by the target CDN, and is other than a standard DNS resolution interface. The API 438 accepts the request location and specified bare domain. The bare domain resolver 112 obtains one or more IP address resolutions directly from the CDN via the API 438. Compared to the flow of FIG. 2, an API replaces the process of obtaining an IP resolution history 275 and qualifying IP addresses 285. In FIG. 4, the API 438 replaces at least the AHM 126.

Additional Embodiments

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

In one implementation, a method is described that includes resolving a DNS request that includes a bare domain name and returning at least one IP address of a CDN edge server, load balancer, cloud-based content, or other resource. A method includes receiving a bare domain DNS request for a first domain from a resolver client at a registered authoritative DNS server. It can include determining a request location associated with the bare domain DNS request and determining at least one target CDN for the bare domain DNS request. A method further includes obtaining, from an AHM IP, addresses of edge servers returned by the target CDN in response to qualified DNS requests for subdomains of the first domain. The method returns one or more IP addresses of the target CDN responsive to the bare domain DNS request for the first domain.

This method and other implementations of the technology disclosed can each optionally include one or more of the following features. The method can use either the location of resolver or the location of the web client being served by the resolver as the request location. The request location can be either an approximate physical location or a logical network location. A logical network location typically is within service provider's autonomous system IP address block. The IP addresses returned can be IP addresses of edge servers on the CDN, of cloud based resources, of load balancers or other devices used to reduce latency in responding to requests for content.

The method can further include considering multiple CDNs and obtaining recent performance data of the multiple target CDNs for the request location and the first domain. Recent performance data means recent portion of data collected on an ongoing basis. The recent portion can be within the last minute, the last 10 minutes, the last 30 minutes, or an hour.

Recent access history can sometimes include a longer period than performance data, when edge servers assigned to service a domain zone do not change as often as network congestion changes. In some implementations, older access history is only used if there is more recent history to show a continuing access pattern. For instance, older access history may need to be confirmed by access history compiled within the last three, six, or eight hours. The AHM 126 can handle analysis of access history.

Considering multiple CDNs can lead to selecting one particular target CDN based, at least in part, on the recent performance data and returning the IP addresses of edge servers, etc. for the particular CDN.

Other implementations can include an authoritative DNS server device and a computer program product that tangibly embodies instructions executable by the DNS server or another processor to perform any of the methods and method features described above. The system implementation may include a system comprising memory in one or more processors operable to execute instructions, stored in the memory, perform a method as described above. The systems can include the components illustrated in the figures and described above.

What is claimed is:

1. A method of resolving a first DNS request for a bare domain requested by a web client, the method comprising:
    at an access history monitor:
        maintaining an access history database;
        collecting data reflecting subdomain IP addresses to which second qualified DNS requests for subdomains of the bare domain have been resolved; and
        updating the access history database with the collected data;
    at a registered authoritative DNS server:
        receiving the first DNS request for the bare domain requested by the web client, wherein the bare domain is an apex zone that cannot have a canonical name (CNAME) DNS record;
        determining a first target CDN for the first DNS request, wherein the collected data of the access history database includes data reflecting first subdomain IP addresses returned by the first target CDN for one or more of the subdomains of the bare domain;
        obtaining, from the access history monitor, one or more of the first subdomain IP addresses; and
        returning the one or more first subdomain IP addresses responsive to the first DNS request;
        wherein the bare domain is resolved to subdomain IP addresses of the first target CDN, in a CDN-agnostic manner.

2. The method of claim 1, wherein the determining a first target CDN is based at least partly on a location of the web client.

3. The method of claim 1, wherein the determining a first target CDN is based at least partly on a request location that is an approximate physical location of the web client.

4. The method of claim 1, wherein the determining a first target CDN is based at least partly on a request location that is a logical network location within a service provider's Autonomous System IP address block.

5. The method of claim 1, further comprising:
    determining a request location from which the first DNS request originated;
    determining a plurality of candidate CDNs;
    obtaining recent performance data of the plurality of candidate CDNs for the request location and the bare domain; and
    selecting, from the plurality of candidate CDNs, the first target CDN based, at least in part, on the recent performance data of the first target CDN.

6. The method of claim 1, further including qualifying the obtained one or more first subdomain IP addresses as being operational before returning them.

7. The method of claim 1, wherein the first subdomain IP addresses returned by the first target CDN are IP addresses of edge servers.

8. The method of claim 1, wherein the collected data is obtained from survey code running on one or more clients.

9. The method of claim 1, further comprising permuting an order of the obtained one or more first subdomain IP addresses before returning them.

10. The method of claim 1, wherein the obtained one or more first subdomain IP addresses are exactly one IP address.

11. The method of claim 1, wherein the first target CDN comprises a cloud-based content source.

12. The method of claim 1, wherein the collecting is performed for the second qualified DNS requests for selected subdomains of the bare domain, and the collecting is not performed for third qualified DNS requests for other subdomains of the bare domain.

13. The method of claim 1, further comprising selecting the one or more first subdomain IP addresses from a plurality of available subdomain IP addresses returned by the first target CDN for the one or more subdomains of the bare domain, based on performance of the available subdomain IP addresses to an approximate physical location of the web client.

14. An authoritative DNS server device comprising:
    a request processor, memory coupled to the request processor and at least one port coupled to the processor, the memory tangibly embodying instructions that cause the request processor to:
    link with a recent resolution history database that comprises data collected from survey code running on one or more clients, the collected data comprising IP addresses to which second qualified DNS requests for subdomains of one or more bare domains have been resolved, wherein each of the one or more bare domains is an apex zone that cannot have a canonical name (CNAME) DNS record;
    receive at the port, from a resolver client, a first bare domain DNS request for a first bare domain of the one or more bare domains;
    determine at least one target CDN for the first bare domain DNS request, wherein the collected data of the recent resolution history database includes data reflecting first subdomain IP addresses returned by the at least one target CDN in response to one or more of the second qualified DNS requests;
    retrieve, from the recent resolution history database, one or more of the first subdomain IP addresses;

resolve the first bare domain to the one or more first subdomain IP addresses; and return the one or more first subdomain IP addresses, responsive to the first bare domain DNS request;

wherein the authoritative DNS server is configured to operate in an environment where a client can seek to access a bare domain hosted on a plurality of CDN infrastructures.

15. The device of claim 14, further including instructions to determine a requestor being served by the resolver client, and wherein the determining at least one target CDN is based at least partly on a location of the requestor.

16. The device of claim 14, wherein the determining at least one target CDN is based at least partly on a request location that is a logical network location within a service provider's Autonomous System IP address block.

17. The device of claim 14, further including instructions to:

determine a request location from which the first bare domain DNS request is received;

determine a plurality of candidate CDNs;

look up recent performance data of the plurality of candidate CDNs for the request location and the first bare domain; and select, from the plurality of candidate CDNs, the at least one target CDN based, at least in part, on the recent performance data of the at least one target CDN.

18. The device of claim 14, wherein the first subdomain IP addresses are IP addresses of edge servers.

19. The authoritative DNS server device of claim 14, wherein the determined at least one target CDN is exactly one CDN.

20. A non-transitory computer readable program product storing instructions that, when executed by at least one processor, cause the at least one processor to:

receive a bare domain DNS request for a first bare domain from a resolver client, wherein the first bare domain is an apex zone that does not have a canonical name (CNAME) DNS record;

determine a first target CDN for the first bare domain;

access a resolution history database that contains subdomain IP addresses previously returned by the first target CDN in response to qualified DNS requests for particular selected subdomains of the first bare domain, and that excludes subdomain IP addresses previously returned by the first target CDN in response to qualified DNS requests for other subdomains of the first bare domain;

resolve the first bare domain to one or more of the contained subdomain IP addresses; and return the one or more subdomain IP addresses of the first target CDN responsive to the bare domain DNS request;

wherein the at least one processor is part of an authoritative DNS server.

21. The non-transitory computer readable program product of claim 20, wherein the determining a first target CDN is based at least partly on a request location that is an approximate physical location associated with the bare domain DNS request.

22. The non-transitory computer readable program product of claim 20, wherein the determining a first target CDN is based at least partly on a request location that is a logical network location within a service provider's Autonomous System IP address block.

23. The non-transitory computer readable program product of claim 20, further including instructions causing the processor to qualify the first subdomain IP addresses as being operational before returning them.

24. The non-transitory computer readable program product of claim 20, wherein entries in the recent resolution history database that lack corresponding entries within a last six hours are not returned by the processor.

25. The non-transitory computer readable program product of claim 20, wherein the subdomain IP addresses previously returned by the target CDN are IP addresses of edge servers.

26. The non-transitory computer readable program product of claim 20, wherein the resolution history database is maintained by a resolution history monitor that is coupled to and distinct from the authoritative DNS server.

27. The non-transitory computer readable program product of claim 20, wherein the instructions for the determining a first target CDN, when executed, cause the processor to:

determine a request location associated with the bare domain DNS request;

determine a plurality of candidate CDNs;

obtain recent performance data of the plurality of candidate CDNs for the request location; and select the first target CDN based, at least in part, on the recent performance data for the first target CDN.

* * * * *